Aug. 1, 1950     J. H. ALPHIN, JR     2,517,160

DISK HARROW MOVER

Filed April 8, 1948

*INVENTOR.*
J. H. ALPHIN JR

BY

*A. Yates Dowell*

ATTORNEY

Patented Aug. 1, 1950

2,517,160

UNITED STATES PATENT OFFICE 2,517,160

DISK HARROW MOVER

Joseph H. Alphin, Jr., Wendell, N. C.

Application April 8, 1948, Serial No. 19,821

6 Claims. (Cl. 214—75)

This invention relates to article handling and more particularly to a vehicle for moving a disk harrow or other farm implement, particularly those which would cause damage to the surface over which they are transported unless they were elevated and out of contact therewith during such movement.

Heretofore disk harrows and farm implements of a similar character have been frequently allowed to remain in the field after they were used due to the fact they were cumbersome or otherwise difficult to move and further because they would cut or otherwise adversely affect the surface over which they were moved.

Cutting of the surface was particularly undesirable when it included highways having a macadam surface or the like which was easily injured by the farm implement.

The damage to disk harrows and farm implements of related nature has been great and their life has been short due to being subjected to the weather and it is particularly desirable in view of the shortage of certain critical materials including metals to obtain maximum service and minimum upkeep cost, also to increase the use to which the vehicle could be put.

It is an object of the invention to provide means by which a farm implement, such as for example a disk harrow, can be easily moved from one location to another in the simplest manner, with the least effort by a single individual, at minimum cost to the owner and consequent elimination of damage to roads and other surfaces over which the vehicle is transported.

A further object of the invention is to provide a vehicle for moving a farm implement the use of which vehicle will result in a saving of the power required and consequent cost in the moving of the vehicle.

Another object of the invention comprises a vehicle of durable, economical material consisting of few parts which can be readily assembled and the device utilized to produce the advantages enumerated, as well as, a device particularly adapted for use in cooperative farming so that it becomes practical by community use of equipment to increase the productivity of the farm at a reasonable cost.

Figure 1:
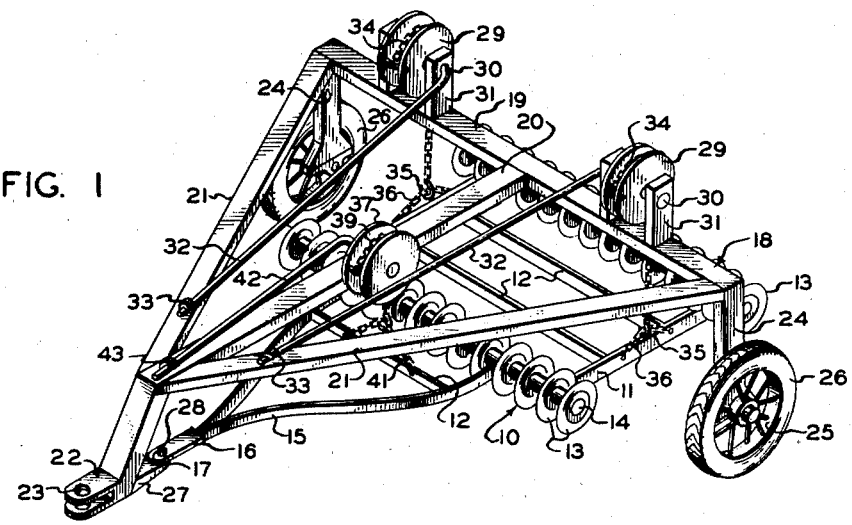
Figure 2:
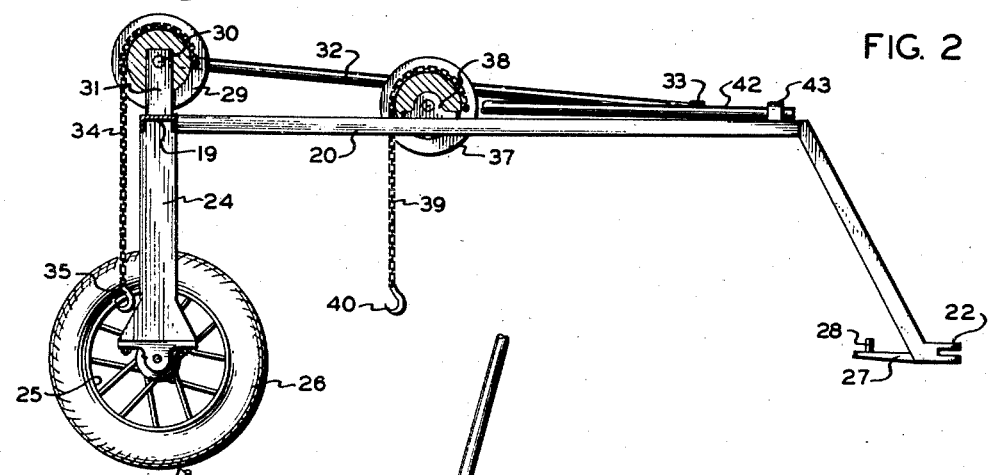

Further objects and advantages of the invention will be apparent from the following description taken in conjunction with the drawings, wherein:

Fig. 1 is a perspective showing one application of the invention;

Fig. 2 a side elevation with certain parts in section, and

Figure 3:
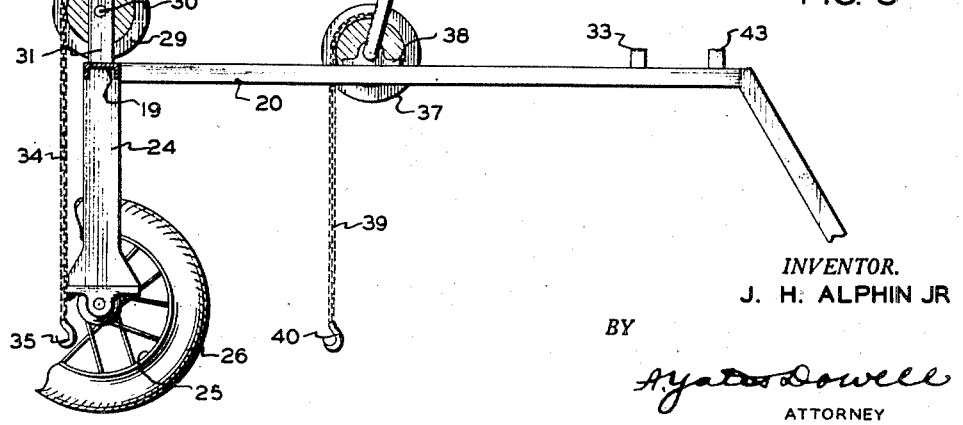

Fig. 3 a similar view with certain of the parts in different position.

With continued reference to the drawings, there is shown in Fig. 1 a more or less conventional disk harrow 10 having side frame members 11, cross frame members 12 and harrow disks 13 mounted on a shaft 14 journaled for rotation in side members 11. The harrow may be provided with one or more sets of harrow disks 13 depending on the size of the farm on which the implement is to be used and also on the degree of fineness to which it is desired to reduce the soil prior to planting.

The harrow 10 is provided with a bridle 15 which is normally for attachment to a tractor in order to tow the harrow around the field, the bridle 15 terminating in a hitch 16 having aperture 17 therein for reception of a pin to provide secure attachment to the towing vehicle. Obviously where the harrow is to be moved from field to field or from field to storage shed by towing the same along a road or other surface, the disk 13 in contact therewith would be likely to cause considerable damage and in fact the laws of several States prohibit movement of such implements over State highways. The vehicle about to be described provides a simple and economic means for transporting the harrow or other similar implement without danger of injury to the highway or other surface.

In accordance with this invention there is provided a vehicle 18 having cross frame member 19, longitudinal frame member 20, and side frame members 21 attached to the outer ends of cross frame member 19 and converging and being attached to the longitudinal frame member 20 at a point near the forward end of the same. Longitudinal frame member 20 extends downwardly and forwardly at its forward end and terminates in a towing hitch 22 provided with an aperture 23 for reception of a pin provided to securely attach the vehicle 18 to the towing vehicle.

At each end of the cross frame member 19 there are provided vertical vehicle supporting frame members 24 to the lower ends of which are attached a pair of wheels 25 which may be provided with conventional pneumatic tires 26. Also attached to the forward end of longitudinal frame member 20 and extending rearwardly from the hitch 22 there is provided a plate-like member 27 having upstanding pin 28 the purpose of which will presently appear. It will be seen that the structure above described provides a relatively high two-wheel vehicle having considerable clearance between the wheels, and which vehicle is adapted to be moved over the highway or other surface by a towing vehicle, the only portion thereof in contact with the highway being rubber tired wheels 25.

The above described vehicle is utilized for moving disk harrows or other similar farm implements by hoisting the same into the space between the pair of wheels to a height sufficient for the disks of the harrow to clear the surface over which it is proposed to move the same and for this purpose hoisting means easily operable by one person is provided on the frame of the vehicle, the hoisting means conveniently comprising a pair of winding drums 29 mounted on shafts 30 journaled in upstanding brackets 31 secured to the cross frame member 19.

Relatively long operating levers 32 are attached to the inner ends of shafts 30 and there are provided adjacent the forward ends of side frame members 21, hook-like members 33 beneath which the forward ends of levers 32 may be engaged to prevent retrograde movement thereof. Hoisting chains 34 may be wound around the winding drums 29 these chains terminating at their lower ends in hooks 35 which are adapted to engage short lengths of chain 36 secured to the side frame members 11 of the harrow.

In order to assist in raising the harrow and to steady the same in its elevated position, there may be provided a third winding drum 37 journaled in a bearing 38 secured to the longitudinal frame member 20 at substantially the mid-point thereof. A chain 39 may be wound around drum 37, chain 39 terminating at its lower end in a hook 40, which is adapted to engage a short length of chain 41 secured to one of the cross members 12 of the harrow. A relatively long operating lever 42 is secured to the shaft on which drum 37 is mounted and a hook-like member 43 is secured to the longitudinal frame member 20, the forward end of the lever 42 being engaged under hook-like member 43 in order to prevent retrograde movement thereof.

The operation of the vehicle forming this invention is extremely simple, it only being necessary to back the vehicle 18 over a harrow or other implement resting on the ground with the harrow positioned substantially centrally between the wheels 25 and also with the chains 36 and 41 positioned substantially directly below winding drums 29 and 37 respectively. At this time levers 32 and 42 are disengaged from beneath hook-like members 33 and 43 respectively and are moved upwardly and rearwardly to rotate the drums 29 and 37 thus lowering chains 34 and 39 with their attached hooks 35 and 40, when lowered hooks 35 and 40 are engaged with chains 36 and 41 respectively. The levers 32 and 42 are now moved in the reverse direction to wind the chains on the drums thus raising the harrow 10 above the ground where it will occupy a suspended position beneath the frame of the vehicle 18 and between the wheels 25.

The harrow is further stabilized in this position by engagement of the aperture 17 in hitch 16 over the pin 28 on member 27 attached to the longitudinal frame member 20. When the raising of the harrow 10 is completed the ends of levers of 32 and 42 are engaged under hook-like members 33 and 43 to prevent retrograde movement thereof and consequent undesired lowering of the harrow 10. Other equivalent means such as flexible loops and the like may of course be used to replace hook-like members 33 and 43. At this time the vehicle 18 may be attached to a towing vehicle for movement to any desired location where upon arrival the process is reversed to deposit the harrow upon the ground ready for use.

It is to be noted that the levers 32 and 42 are of sufficient length to provide the necessary mechanical advantage whereby one person may easily operate the device to raise any harrow normally in use at the present time and therefore it will be seen that this vehicle provides a very simple, efficient and economic means for transporting a harrow or similar implement with the use of a minimum of equipment and manpower.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A vehicle for use in moving a disk harrow or similar implement suspended there-beneath comprising a frame having a cross member, a longitudinal member, and side members, upright vehicle supporting members secured to each end of said cross member, wheels rotatably secured to the lower ends of said upright members, a pair of winding drums rotatably mounted on said cross member, a single winding drum rotatably mounted on said longitudinal member at substantially the mid point thereof, chains on said winding drums, hooks on said chains for engagement with said harrow, operating levers attached to said drums, whereby upon operation thereof in one direction said harrow will be raised and in the opposite direction said harrow will be lowered, hook-like members fixed to said longitudinal member and said side members, whereby the forward ends of said levers may be engaged there-beneath to prevent retrograde movement thereof, a towing hitch on the forward end of said longitudinal member and means adjacent the forward end of said longitudinal member for engagement with the towing hitch on said harrow, whereby said harrow is stabilized in suspended position beneath said vehicle.

2. A vehicle for use in moving a disk harrow or similar implement suspended there-beneath comprising a frame, wheels rotatably mounted on said frame, a plurality of winding drums rotatably mounted on said frame, chains on said winding drums, hooks on said chains for engagement with said harrow, operating levers attached to said drums whereby upon operation thereof in one direction said harrow will be raised and in the opposite direction said harrow will be lowered, hook-like members fixed to said frame whereby the forward ends of said levers may be engaged there-beneath to prevent retrograde movement thereof, a towing hitch on the forward end of said frame and means adjacent the forward end of said frame for engagement with the towing hitch of said harrow whereby said harrow is stabilized in suspended position beneath said vehicle.

3. A vehicle for use in moving a disk harrow or similar implement suspended there-beneath comprising a frame, wheels rotatably mounted on said frame, a plurality of winding drums rotatably mounted on said frame, flexible means engaging said winding drums, and having means thereon for engagement with said harrow, levers attached to said drums whereby upon operation thereof in one direction said harrow will be raised and in the opposite direction said harrow will be lowered, hook-like members fixed to said frame whereby the forward ends of said levers may be engaged there-beneath to prevent retrograde movement thereof, a towing hitch on the forward end of said frame and means adjacent the forward end of said frame for engagement with the towing hitch on said harrow whereby said harrow is stabilized in suspended position beneath said vehicle.

4. A vehicle for use in moving a disk harrow or similar implement suspended there-beneath comprising a frame, wheels rotatably mounted on said frame, a plurality of winding drums rotatably mounted on said frame, a flexible means engaging said winding drums and having means for engagement with said harrow, levers attached to said drum, whereby upon operation thereof in one direction said harrow will be raised and in the opposite direction said harrow will be lowered, means on said frame for engagement with said levers when said harrow is in raised position whereby retrograde movement thereof is prevented, a towing hitch on the forward end of said frame and means adjacent the forward end of said frame for engagement with said harrow whereby said harrow is stabilized in suspended position beneath said vehicle.

5. A vehicle for use in transporting articles suspended therebeneath, comprising a frame, wheels mounting said frame, elevating mechanism including spaced winding drums mounted on said frame balanced relative to the center of gravity of said frame, flexible means connected to said drums, engaging means on said flexible means for engagement with articles to be transported, and individual operating levers for rotating said drums to raise and lower the articles to be transported.

6. A vehicle for use in transporting articles suspended therebeneath, comprising a frame, wheels mounting said frame, elevating mechanism including spaced winding drums mounted on said frame balanced relative to the center of gravity of said frame, flexible means connected to said drums, engaging means on said flexible means for engagement with articles to be transported, individual operating levers for rotating said drums to raise and lower the articles to be transported, and locking means for engaging said levers to secure said elevating mechanism in fixed position.

JOSEPH H. ALPHIN, Jr.

REFERENCES CITED

The following references are of record in the file of this patent:

UNITED STATES PATENTS

| Number | Name | Date |
|---|---|---|
| 2,301,994 | Atkinson | Nov. 17, 1942 |
| 2,398,147 | McKay | Apr. 9, 1946 |
| 2,442,273 | Lofshult | May 25, 1948 |
| 2,452,338 | Thompson | Oct. 26, 1948 |
| 2,454,675 | Showalter | Nov. 23, 1948 |